Patented Feb. 4, 1936

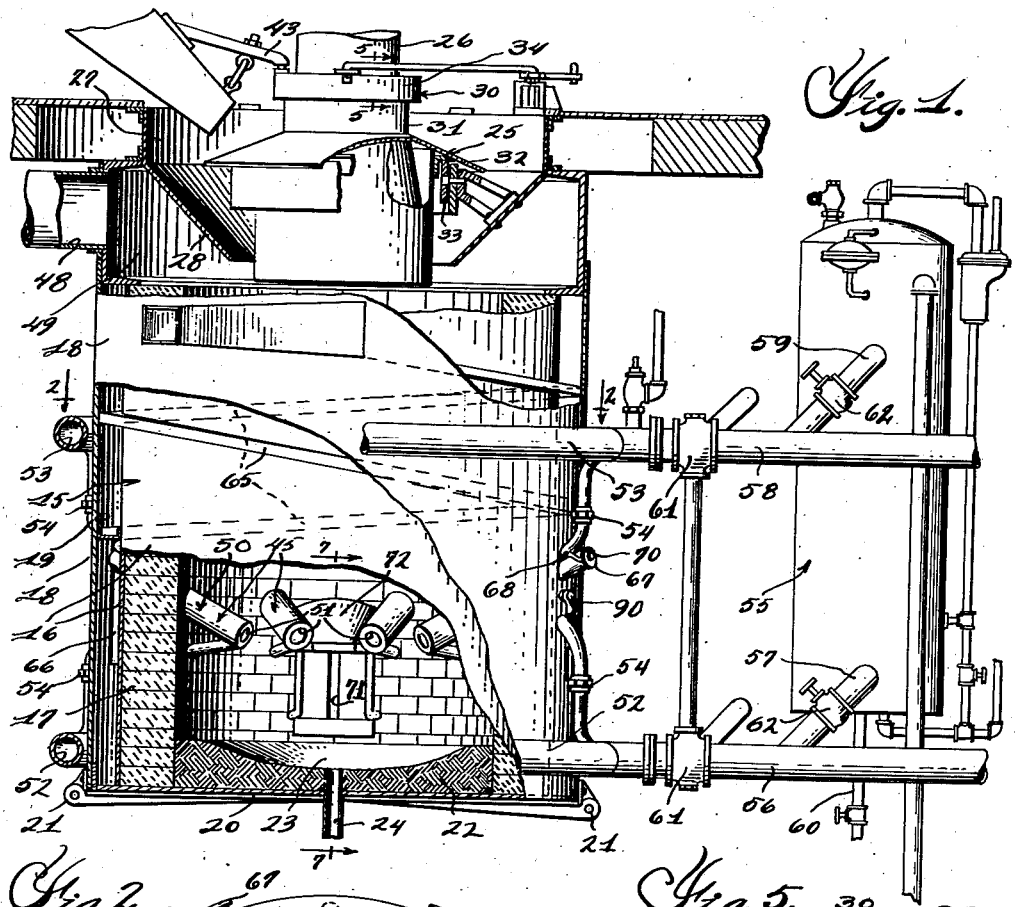

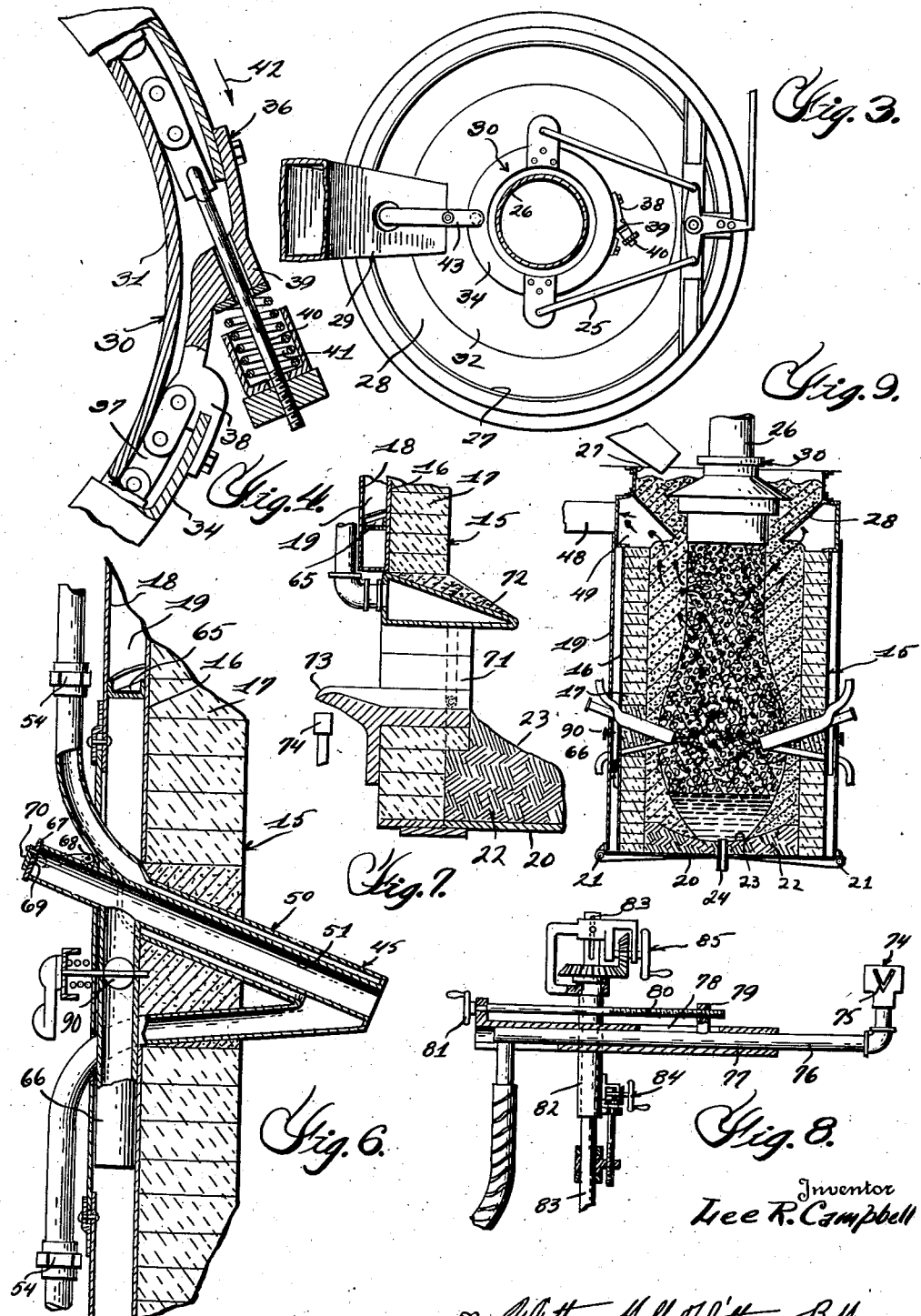

2,029,307

UNITED STATES PATENT OFFICE 2,029,307

METHOD AND APPARATUS FOR MANUFACTURING PRODUCTS BY SUBJECTING A MATERIAL TO RELATIVELY HIGH TEMPERATURES

Lee R. Campbell, Hazel Park, Mich.

Application November 25, 1932, Serial No. 644,408

7 Claims. (Cl. 266—27)

This invention relates generally to a method and apparatus for manufacturing products of the type requiring the application of heat under relatively high temperatures to a material during the formation of the same.

Although this invention may be advantageously employed in the manufacture of practically any product necessitating the use of extremely high temperatures, nevertheless, it finds particular utility when utilized in the manufacture of mineral wool of the type now commercially employed for heat insulation purposes.

Heretofore in the manufacture of mineral wool, a furnace was charged by inserting alternate layers of a combustible material such as coke and screen rock or other substance transformable in the presence of high temperatures to a molten slag possessing the desired properties to form the mineral wool. Upon completion of the charging operation, air has usually been introduced into the furnace to effect the combustion necessary to obtain the temperatures required to form a molten slag from the rock or other substance employed whereupon the slag is drawn from the furnace and immediately spun to form mineral wool. It is a generally accepted fact in the trade that the above process is extremely inefficient due to the high heat losses instituted by uncontrolled combustion and the particular method employed in charging the furnace. Furthermore, the cost of installation of the equipment required in the manufacture of mineral wool in accordance with the above process is extremely high due to the fact that this process necessitates the provision of intricate furnace construction having water jacketed side walls to permit dissipating the heat escaping through these walls which would otherwise transform the same to a liquid state. The relatively high cost of installation of a plant of the above type for producing mineral wool and the extremely low operating efficiency of such a plant renders the cost of production of mineral wool so high as to materially restrict its commercial use. Moreover, the quality of mineral wool heretofore produced by the method and plant briefly outlined above was not entirely satisfactory due to the fact that the finished product usually contained an excessive quantity of carbon and other impurities.

The present invention contemplates increasing the commercial use of mineral wool by providing a method and apparatus which is extremely efficient in operation and inexpensive to install. One of the principal objects of this invention which contributes materially to increasing the efficiency and reducing the cost of installation of plants of the character referred to above resides in the novel method employed in charging the furnace, together with the means for insuring controlled combustion in the latter. In accordance with the present invention, the above results are secured by feeding the substance to be heated into the furnace around the combustible material and by extending the tuyères or air discharging devices beyond the inner side walls of the furnace in such a manner as to direct the air downwardly toward the bottom or slag-receiving portion of the furnace. In other words, the combustion zone is centralized within the furnace adjacent the bottom of the latter, and this feature, together with the method of charging, insures a relatively low temperature immediately adjacent the inner side wall of the furnace, with the result that the slag coming in contact with this lower temperature zone solidifies and forms a protective coating upon the inner surfaces of the aforesaid walls. This protective coating is desirable since it minimizes the rate of heat transfer through the side walls of the furnace and prevents wall erosion from gas and slag action.

Another object of this invention which provides for increasing the efficiency of the apparatus resides in preheating the rock or other substance adjacent the top of the furnace by compelling the products of combustion or the flue gases to flow therethrough during their passage out of the furnace.

Another advantageous feature of this invention is attributed to the means employed for automatically distributing the substance to be heated into the furnace around the combustible material in accordance with the rate of consumption of said material at different points in the furnace. By reason of this feature, a layer of the rock or other substance to be heated between the combustible material and adjacent wall of the furnace is insured at all times during the operation of the latter.

In addition to the foregoing, the present invention contemplates utilizing any heat escaping through the side walls of the furnace to preheat the air discharged into the furnace by the tuyères for the purpose of combustion. This feature is also of importance and increases the operating efficiency of the furnace since it prevents the slag from solidifying over the discharge ends of the tuyères.

A further object of this invention consists in the novel construction of the tuyères and in the manner in which cooling medium is circulated therethrough to prevent melting of the same by the heat in the furnace. The cooling medium circulated through the tuyères preferably passes around the air passages therein and serves to maintain this air at uniform temperatures which is desirable for the purpose specified in connection with the feature previously set forth.

The foregoing as well as other objects will be made more apparent as this description proceeds, especially when considered in connection with the accompanying drawings, wherein:

Figure 1 is a diagrammatic view of the general system employed and showing the furnace partly in section;

Figure 2 is a cross sectional view taken on the line 2—2 of Figure 1;

Figure 3 is a plan view of the feeding mechanism provided;

Figure 4 is a fragmentary sectional view of the feeding means;

Figure 5 is a sectional view taken on the line 5—5 of Figure 1;

Figure 6 is an enlarged sectional view of a portion of the furnace illustrating the construction of the tuyères;

Figure 7 is a sectional view taken substantially on the line 7—7 of Figure 1;

Figure 8 is a side elevational view of the spinning device;

Figure 9 is a sectional view through the furnace illustrating the method of charging the latter.

Referring first to the apparatus for carrying out my improved method and with special reference to Figure 1 of the drawings, it will be noted that this apparatus comprises a furnace 15 suspended in any suitable manner above the flooring of the building within which the same is installed in operative relation to the bins containing the desired combustible material and the substance to be treated. As shown particularly in the above figure, the furnace 15 comprises an inner annular wall 16 lined with a suitable refractory material 17 and having an outer wall 18 concentrically arranged with respect to the inner wall in spaced relation thereto to form therewith an air chamber 19. In addition, the furnace is provided with a bottom wall 20 preferably formed of two sections hingedly connected as at 21 to opposite sides of the furnace in order to permit the latter to be readily cleaned or dumped. Prior to charging the furnace, the inner surface of the bottom wall 20 is lined with a suitable clay 22 fashioned with a recess 23 in the upper face thereof for retaining in the furnace a certain amount of slag as well as the residue or by-products of the substance treated. In the present instance, this residue may be drained from the furnace through the medium of a conduit 24 anchored in the clay bottom during the formation of the same and establishing communication between the interior of the furnace and the atmosphere. The conduit 24, in addition to providing for draining the residue from the interior of the furnace, also permits discharging air into the extreme lower end of the furnace to facilitate igniting the charge upon starting the furnace. It will of course be understood that the communication between the interior of the furnace and atmosphere afforded by the conduit 24 is closed after the charge has been duly ignited so as to prevent escape of the molten slag.

As previously stated, it is one of the objects of the present invention to provide means for automatically distributing the substance to be heated around the combustible material in the furnace in accordance with the demand of different portions of the furnace. The foregoing is accomplished in the present instance by a feeding unit 25 supported upon the upper end of the furnace and comprising a central conduit 26 communicating at one end with the bin or other system of supplying the combustible material or coke and at the opposite end with the interior of the furnace centrally thereof. The substance to be heat treated is discharged into the furnace around the combustible material by means of a hopper 27 concentrically arranged with respect to the conduit 26 and having the lower end portion 28 tapered inwardly to a position adjacent the discharge end of the conduit 26. In the specific embodiment of the invention, the substance heat treated is screened rock, and the latter is supplied to the hopper through the medium of a chute 29 extending from the bin containing the screened rock. Both the combustible material and screened rock are preferably conducted to the furnace from the bins by the action of gravity so as to insure a continuous supply of these materials to the furnace throughout the operation thereof.

Although the influence of gravity insures a continuous supply of the substance to be treated, nevertheless, it is desirable to insure accurate distribution of this substance around the combustible material in the furnace so as to insure maintaining a layer of the former between the latter and adjacent side walls of the furnace. In the present instance, the aforesaid desired distribution of the substance to be treated in the furnace is accomplished by means of a distributing head 30 having an axially extending portion 31 concentrically arranged with respect to the upper end of the conduit 26 and having a frusto-conical lower end portion 32 projecting into the hopper in a position to receive the rock discharged from the chute 29. The distributor 30 is rotatably supported within the hopper by means of a series of rolls 33, and rotation of the distributing head is effected by an oscillatory ring 34 journaled as at 35 upon the portion 31 of the head in concentric relation therewith. Any suitable means may be employed for oscillating the ring, and the oscillatory motion thereof is converted into an intermittent progressive movement of the distributing head by means of a clutch 36. In the present instance, the clutch 36 comprises a flexible member or chain 37 encircling the portion 31 of the head in frictional engagement therewith, and as shown in Figure 4, the ends thereof are spaced from each other. It will be observed from Figure 4 that one end of the chain is connected to the ring 34 through the medium of a bracket 38 provided with an intermediate portion 39 apertured to receive a plunger 40 having one end fixed to the opposite end of the chain and having a spring 41 associated with the opposite end in such a manner as to normally urge the plunger in a direction to frictionally engage the chain with the distributing member 31. The above arrangement is such that a rotative movement of the ring in the direction of the arrow 42 in Figure 4 compresses the spring 41, and in so doing, increases the frictional resistance between the chain and header 30 so as to effect a corresponding movement of the latter. On the other hand, a rotative movement of the ring in the opposite direction decreases the spring action to such an extent as to permit the chain to slip around the distributing head without imparting motion thereto. If desired, the delivery end of the chute 29 may be operatively connected to the ring as at 43 so as to oscillate therewith and thereby discharge the substance to be heated over an area of the frusto-conical portion 32 corresponding to the angular extent of oscillation of the ring. Thus, from the foregoing, it will be apparent that the distributor head serves to maintain a substantially constant feed of the substance to be heated around the combustible material irrespective of any difference in consumption of one part of the furnace relative to another.

As previously stated, it is a further object of this invention to obtain maximum efficiency by localizing the zone of combustion centrally of the furnace adjacent the bottom thereof, and this is accomplished herein by providing a plurality of tuyères 45 arranged around the furnace at circumferentially spaced points as shown particularly in Figure 2. The tuyères extend into the furnace through the several walls aforesaid thereof to a point adjacent the center of the furnace and are inclined downwardly to direct air toward the bottom of the furnace. The discharge ends of the tuyères are preferably disposed diametrically opposite each other and effect a circulation of the air in the manner designated in Figure 9 so as to more readily melt the screened rock or other substance to be heated in the lower regions of the furnace. The location of the discharge ends of the tuyères within the furnace in the manner specified above not only insures centralizing the zone of combustion, but also insures a coating of the substance to be heated upon the inner surfaces of the inner wall 16 of the furnace. In other words, combustion is so controlled in the furnace that the temperature adjacent the walls 16 is not sufficient to completely melt the screened rock adjacent these walls, with the result that the latter prevent excessive heat losses through the walls of the furnace. In dwelling upon the heat efficiency of the furnace, attention at this time may be directed to the manner in which the screened rock or other substance is preheated during its passage to the lower regions of the furnace by the escape of the flue gases. In the present instance, the flue gases are discharged from the furnace through a stack 48 communicating at the inner end with an annular chamber 49 formed by the frusto-conical portion 28 of the hopper and adjacent upper walls of the furnace. With this construction, the flue gases must necessarily pass through the screened rock at the upper portions of the furnace in order to be discharged from the latter through the stack 48. Consequently, practically all of the heat generated in the furnace is used for the purpose intended, and the efficiency of the apparatus is thereby greatly increased.

Inasmuch as substantial portions of the tuyères extend into the combustion zone of the furnace, it is desirable to water cool the same, and for accomplishing this result, each of the tuyères is provided with a water jacket 50 encircling the air passages 51 therethrough and communicating with a source of water supply through the medium of a header 52 encircling the lower end of the furnace. The jackets also communicate with an upper circumferentially extending header 53 extending back to the source of supply for returning the cooling medium or water thereto. Each of the tuyères is connected in the water circulatory system through the medium of couplings 54 located exteriorly of the furnace and readily detachable so as to facilitate removal of the tuyères from the furnace when desired.

A thermosiphon system of water circulation is shown herein, and in the present instance, water is conducted to the lower header 52 from a suitable tank 55 through the intermediary of a conduit 56 having a branch 57 communicating with the lower end of the tank 55. The return or upper header 53 communicates with the lower header 52 through the water jackets in the tuyères, and in turn communicates with a conduit 58 having a branch 59 extending into the upper end of the tank 55. Water or other suitable cooling medium is supplied to the tank 55 through the valve controlled inlet conduit 60, and the temperature of the water in the circulating system may be varied to a certain extent by changing the pressure in the tank. If desired, the ends of both the conduits 56 and 58 may be arranged in communication with a steam boiler so as to provide for cleaning the water circulatory system. When the aforesaid conduits are connected to a steam boiler for the above purpose, I provide three-way valves 61 in the conduits between the tank 55 and headers 52 and 53. The construction is such that alternate operations of the valves will provide for passing the cleaning fluid through the system in opposite directions. In this connection, it is to be understood that water at the boiler temperature may be circulated through the system by maintaining the water in the boiler at the proper level and by providing valves 62 in the branch conduits 57 and 59 to permit closing communication therethrough.

Although it has been previously stated that a relatively small amount of heat escapes through the inner walls 16 of the furnace, nevertheless, I contemplate utilizing the small amount of heat transferred through these walls to preheat the air supplied to the tuyères. In the present instance, air under pressure is supplied to the chamber 19 at the upper end thereof, and this air is compelled to flow through a circuitous path of travel to a point in the aforesaid chamber substantially below the tuyères. The circuitous path of travel of the air is provided for by forming a spiral 65 on the inner wall 16 of the furnace in the chamber 19 so as to compel the air to circumvent this wall several times before it is drawn into the air passages 51 of the tuyères. The air is collected from the lower regions of the chamber 19 and conducted to the central air passages 51 of the tuyères by means of valve controlled conduits 66 formed integral with the tuyères in such a manner as to communicate at the upper ends with the aforesaid central air passages and at the lower ends with the chamber 19. By preheating the air discharge by the tuyères into the furnace and maintaining this air at a substantially uniform temperature by circulating the cooling medium around the central air passages through the tuyères, the tendency for slag to solidify over the discharge ends of the tuyères is minimized. However, in order to prevent any solidification of slag over the discharge ends of the tuyères from interfering with the operation of the latter, means is provided whereby this slag may be readily dislodged from the ends of the tuyères. For accomplishing this result, I provide a detachable cap 67 for the outer end of the air passage of each tuyère hingedly mounted as at 68 to facilitate operation thereof and provided with a peep hole 69 of sufficient diameter to permit the extension of a rod therethrough in the event the passage becomes clogged for any reason. The peep hole is normally closed by means of a cover 70 pivotally connected in any suitable manner to the cap 67.

The molten slag is withdrawn from the furnace through a relatively narrow vertical slot 71 spaced a predetermined distance above the bottom of the furnace and protected by a suitable shelf 72 extending inwardly from the furnace above the upper end of the slot. Deterioration of the shelf by the relatively high temperatures at the combustion zone of the furnace is prevented by circulating the cooling medium therethrough as clearly shown in Figure 1 of the drawings.

The molten material discharged from the slot 71 in the furnace is compelled to flow over a lip 73 projecting forwardly from the front wall of the furnace and is spun to form the mineral wool in the usual manner by subjecting the same to a steam jet.

In order to obtain efficient results, it is quite necessary to maintain an accurate relationship between the stream of molten metal and the spinning device. This is accomplished herein by mounting the spinning device 74 in such a manner as to provide for substantial universal adjustment thereof relative to the stream of slag flowing from the slot 71. In detail, the jetting device comprises a jet 75 positioned substantially vertically and communicating at the lower end with a horizontally disposed steam supply pipe 76 telescopically engaging a conduit 77 having an elongated slot 78 in the upper wall for receiving a nut 79 fixed to the steam pipe 76. The nut 79 has a threaded engagement with a rod 80 rotatably supported in any suitable manner and having a hand wheel 81 at the outer end thereof to permit rotation of the rod to effect adjustment of the jet 75 in a horizontal plane. In order to provide for adjusting the elevation of the jet 75, the guide member 78 for telescopically engaging the steam supply pipe has fixed thereto a tubular member 82 telescopically engaging a relatively fixed guide 83. The tubular member and associated guide 83 extend at substantially right angles to the member 78, and adjustment of the tubular member 82 is effected axially of the guide 83 by adjusting mechanism 84 similar in construction to the adjusting means hereinbefore set forth. In addition to the aforesaid adjustments, provision is made for angularly adjusting the jet 75 in a direction transverse to both the aforesaid directions, and this is accomplished by effecting a rotative movement of the member 82 about the guide 83 through the medium of suitable adjusting mechanism 85. Thus, from the above, it will be seen that I have provided means for adjusting the spinning device in three directions, each direction being transverse to the other two.

Referring now to the method of forming the mineral wool, it will be noted that the first step in this method is to form the desired clay bottom 22 on the lower wall 20 of the furnace. As previously stated, the clay bottom is fashioned with a recess 23 in the upper face thereof for retaining a certain quantity of molten slag and residue of the screened rock during the operation of the furnace. After the clay bottom has been formed in the furnace, a small amount of kindling is placed upon the bottom wall thereof. In order to permit access to the interior of the furnace, the feeding unit 25 is attached to the furnace in such a manner as to be readily removed therefrom in order to provide access to the furnace for forming the bottom and properly placing ignition charge.

After the kindling has been deposited in the furnace, a supply of coke or other suitable combustible substance is then placed concentrically around and over the kindling to a point above the tuyères. The lateral distribution of heat from the kindling material and ignition of coke, or other combustible substance, is directed toward the side walls of the furnace by imposing thereon a suitable removable heat baffle. When the combustion of the above described material has progressed so as to form a zone of heat generation of suitable temperature and extent relative to the water cooled tuyères and side walls, air is admitted through the water cooled tuyères, and the air supply through the furnace bottom is discontinued. The zone of heat generation extends laterally to a point between the delivery end of the tuyères and the furnace side walls. Combustion then proceeds until suitable temperatures are obtained in the walls surrounding the discharge slot 71 to prevent chilling of molten material as the same passes therethrough. The air supply is then shut off and the baffle removed, whereupon a light smothering bed of coke is added through a suitable charging tube. This tube is of the same diameter as the coke feeder tube 26. The furnace is then charged with combustible material and rock or other substance. The latter substance is segregated from the combustible material by the charging tube up to the elevation of the discharge end of the feeder. The charging tube is then removed from the furnace and the feeder placed in operation. Air is again admitted through the water cooled tuyères and the operation is then continuous and automatic. The products of combustion are then caused to pass out of the furnace through the screen rock at the upper end of the furnace so as to heat this rock prior to conveying the same to the combustion zone of the furnace.

Communication between the interior of the furnace and atmosphere through the conduit 24 is of course discontinued as soon as the furnace is set into operation, and the molten slag is discharged out of the furnace through the slot 71 into operative relation to the spinning device 74. The device 74 is previously adjusted to assume an accurate position with respect to the flow of slag so as to insure efficient spinning of the slag.

What I claim as my invention is:

1. Apparatus for transforming material in the solid state to a molten mass by the application of heat comprising, a furnace having a chamber for receiving a charge of the material to be heated and a charge of combustible material, means for discharging the combustible material in the chamber through the upper end of the latter, and means for feeding the material to be heated into the chamber around the combustible material including, a conveyor for conducting the material to be heated to a point above the upper end of the chamber, a distributor positioned to receive the material discharged from the conveyor and operable to feed the latter material into the chamber between the combustible material therein and the side walls thereof, and means for rotating said distributor by a step-by-step movement.

2. Apparatus for transforming material in the solid state to a molten mass by the application of heat comprising, a furnace having a chamber for receiving a charge of the material to be heated and a charge of combustible material, means for discharging the combustible material in the chamber through the upper end of the latter, and means for feeding the material to be heated into the chamber around the combustible material including, a conveyor for conducting the material to be heated to a point above the upper end of the chamber, a distributor positioned to receive the material discharged from the conveyor and shaped to direct the latter material into the chamber between the combustible material and adjacent side walls of the chamber, means for oscillating the discharge end of said conveyor, and a connection between the oscillating means and distributor for imparting alternate movements of said means to the distributor.

3. Apparatus for transforming material in the solid state to a molten mass by the application of heat comprising, a furnace having a chamber for receiving a charge of the material to be heated and a charge of combustible material, means for discharging the combustible material in the chamber through the upper end of the latter, means for depositing the charge of material to be heated between the combustible material and inner side walls of the chamber, and means for conducting air from a point exteriorly of the furnace to a point within the chamber substantially centrally of the latter whereby the temperature therein adjacent the walls thereof is relatively low and insufficient to liquify the material immediately adjacent the said walls with the result that this solidified mass of material forms a heat insulator to prevent the escape of heat through the walls of the chamber.

4. Apparatus for transforming material in the solid state to a molten mass by the application of heat comprising, a furnace having a chamber for receiving a charge of the material to be heated and a charge of combustible material, means for discharging the combustible material in the chamber through the upper end of the latter, means for depositing the charge of material to be heated between the combustible material and inner side walls of the chamber, means for conducting air from a point exteriorly of the furnace to a point within the chamber substantially centrally of the latter whereby the temperature therein adjacent the walls thereof is relatively low and insufficient to liquify the material immediately adjacent the said walls with the result that this solidified mass of material forms a heat insulator to prevent the escape of heat through the walls of the chamber, and means for preheating the material to be heated in the chamber above the combustion zone by compelling the products of combustion to flow upwardly therethrough upon passing out of the furnace.

5. In the method of forming mineral wool from molten slag, those steps which consist in charging a furnace by depositing a combustible substance therein and by surrounding the latter with a material suitable for forming mineral wool, discharging air into the furnace at a point adjacent the center thereof and in a direction toward the lower end of the same to create a localized combustion zone, and withdrawing the products of combustion out of the furnace through the material at the receiving end of the furnace to preheat the latter.

6. In the method of forming mineral wool from molten slag, those steps which consist in charging a furnace by depositing a combustible substance therein and by surrounding the latter with a material suitable for forming mineral wool, circulating air in the furnace in such a manner as to effect controlled combustion predetermined to readily form molten slag from the material and to provide for the formation of a heat insulating coating of the material on the inner surfaces of the furnace walls.

7. In the method of forming mineral wool from molten slag, those steps which consist in charging a furnace by depositing a combustible substance therein and by surrounding the latter with a material suitable for forming mineral wool, circulating air in the furnace in such a manner as to effect controlled combustion predetermined to readily form molten slag from the material and to provide for the formation of a heat insulating coating of the material on the inner surfaces of the furnace walls, and withdrawing the products of combustion out of the furnace through the material at the receiving end of the latter for preheating said material.

LEE R. CAMPBELL.